(12) United States Patent
Chou et al.

(10) Patent No.: US 10,320,482 B2
(45) Date of Patent: Jun. 11, 2019

(54) CONNECTOR MODULE AND OPTICAL SIGNAL PROCESSING DEVICE CONNECTED THERETO

(71) Applicant: OPTOMEDIA TECHNOLOGY INC., Zhubei (TW)

(72) Inventors: Hui-Tsuo Chou, Zhubei (TW); Ching-Wei Chiu, Zhubei (TW); Pei-Hsiang Hsu, Zhubei (TW)

(73) Assignee: Optomedia Technology Inc., Zhubei (TW)

( * ) Notice: Subject to any disclaimer, the term of this patent is extended or adjusted under 35 U.S.C. 154(b) by 0 days.

(21) Appl. No.: 15/919,362

(22) Filed: Mar. 13, 2018

(65) Prior Publication Data

US 2018/0278329 A1 Sep. 27, 2018

Related U.S. Application Data

(60) Provisional application No. 62/474,156, filed on Mar. 21, 2017.

(51) Int. Cl.
| | |
|---|---|
| *H04B 10/00* | (2013.01) |
| *H04B 10/25* | (2013.01) |
| *G02B 6/38* | (2006.01) |
| *G02B 6/42* | (2006.01) |
| *H04B 10/40* | (2013.01) |
| *H01R 12/71* | (2011.01) |

(52) U.S. Cl.
CPC ....... *H04B 10/2503* (2013.01); *G02B 6/3807* (2013.01); *G02B 6/4279* (2013.01); *G02B 6/4284* (2013.01); *H04B 10/40* (2013.01); *H01R 12/716* (2013.01)

(58) Field of Classification Search
CPC .. H04B 10/40; H04B 10/2503; G02B 6/4231; G02B 6/4204; G02B 6/4257; G02B 6/4281; G02F 6/428; G02F 6/4284
USPC ....... 398/135, 136, 137, 138, 139, 158, 159, 398/164, 41, 79; 385/88, 89, 90, 92, 93
See application file for complete search history.

(56) References Cited

U.S. PATENT DOCUMENTS

| | | | |
|---|---|---|---|
| 9,042,735 B2 * | 5/2015 | Shah ...................... | H04B 10/40 385/92 |
| 2003/0020986 A1 * | 1/2003 | Pang .................... | G02B 6/4201 398/139 |
| 2013/0001410 A1 * | 1/2013 | Zhao ...................... | H05K 1/115 250/227.11 |

(Continued)

*Primary Examiner* — Hanh Phan
(74) *Attorney, Agent, or Firm* — Rosenberg, Klein & Lee

(57) ABSTRACT

The invention provides a connector module and optical signal processing device connected thereto. The optical signal processing device and the connector module are connected together via at least one fiber cable, they are allowed to transmit at least one optical signal therebetween. The connector module comprises a circuit board, a high frequency connector, and at least one photoelectric transducer. The high frequency connector and the photoelectric transducer are configured on the circuit board in a way of COB. Accordingly, the high frequency connector and the photoelectric transducer are implemented on the circuit board in the way of COB, which can effectively reduce the volume and the manufacture cost of the connector module. Besides, the connector module is capable of transmitting signals in the way of optical communication so as to improve the data transfer rate and transmission distance of the connector module.

11 Claims, 5 Drawing Sheets

(56) References Cited

U.S. PATENT DOCUMENTS

2014/0147128 A1\* 5/2014 Han .................... H05K 1/0251
398/135

\* cited by examiner

US 10,320,482 B2

CONNECTOR MODULE AND OPTICAL SIGNAL PROCESSING DEVICE CONNECTED THERETO

This non-provisional application claims priority claim under 35 U.S.C. § 119(a) on U.S. Provisional Application No. 62/474,156 filed Mar. 21, 2017, the entire contents of which are incorporated herein by reference.

FIELD OF THE INVENTION

The present invention relates to a connector module, particularly to a connector module capable of receiving or transmitting an optical signal.

BACKGROUND

In the past, the electrical connector usually occupies a larger space in the motherboard or an electronic device, has a slower data transfer rate, and higher manufacturing costs. Taking an example as explanation, a 1000Base-T in 802.13 communication protocol is usually adopted by the electrical connector, for example, RJ45 connector.

However, the electrical connector conforming to the 1000Base-T standard is usually implemented on the PCB board, which will require more costs, for example, the increase of costs are due to adopt a larger PCB board and special materials for production. Besides, the 1000Base-T in 802.13 communication protocol only supports a shorter transmission distance, for example, the transmission distance is within 100 m.

Accordingly, the present will provide a novelty connector module, which can receive or transmit signals in a way of optical communication so as to improve the above disadvantages of the electrical connector.

SUMMARY

It is one objective of the present invention to provide a connector module, which is implemented by the COB process so that the volume of it will be effectively reduced to form a miniaturized connector module, which will be occupied a small space in the motherboard or electronic device.

It is another objective of the present invention to provide a connector module and an optical signal processing device, in which the connector module and the optical signal processing device can transmit signals in a way of optical communication, which can extend the transmission distance, reduce the signal decay and the radiation disturbance of EMI, and improve the ability of signals energy concentration and the anti-interference.

It is another objective of the present invention to provide a connector module and an optical signal processing device, in which the connector module and the optical signal processing device can transmit the optical signals in bidirectional so as to increase the data transfer rate.

To achieve the above objective, the present invention provides a connector module for optical communication, comprising: a circuit board; a high frequency connector, configured on the circuit board in a way of chip on board; and at least one photoelectric transducer, configured on the circuit board in the way of chip on board, electrically connected to the high frequency connector, and provided at a side thereof with a lens, wherein the photoelectric transducer receives an optical signal via the lens and transforms the optical signal into an electrical signal, and then sends the electrical signal to the high frequency connector; otherwise, the photoelectric transducer receives the electrical signal from the high frequency connector, transforms the electrical signal into the optical signal, and then sends the optical signal via the lens.

In one embodiment of the present invention, wherein the high frequency connector is a gold finger connector, a pin header connector, an FPC connector, a board to board connector, or other type connector capable of transmitting at least one high frequency electrical signal.

In one embodiment of the present invention, wherein the photoelectric transducer and the high frequency connector are configured together on the same surface of the circuit board, or the photoelectric transducer and the high frequency connector are configured on different surfaces of the circuit board.

In one embodiment of the present invention, wherein the connector module is configured on a motherboard of an electronic device, the photoelectric transducer of the connector module is able to send the electrical signal to the motherboard or receive the electrical signal from the motherboard via the high frequency connector.

In one embodiment of the present invention, wherein the circuit board is a motherboard of an electronic device, the photoelectric transducer and the high frequency connector are directly configured on the motherboard.

The present invention further provides an optical signal processing device, which is connected to a connector module, wherein the connector module comprises a circuit board, a high frequency connector, and at least one photoelectric transducer, the high frequency connector and the photoelectric transducer are configured on the circuit board in a way of chip on board, the photoelectric transducer is electrically connected to the high frequency connector, and provided at a side thereof with a lens, the optical signal processing device comprising: at least one optical signal processing unit; and at least one fiber cable comprising an end connected to the optical signal processing unit, and other end connected to the lens of the photoelectric transducer of the connector module by a connection port; wherein at least one optical signal is transmitted between the optical signal processing device and the connector module via the fiber cable, the photoelectric transducer is used for transforming the optical signal into an electrical signal or the electrical signal into the optical signal, the high frequency connector is used for sending the electrical signal to the photoelectric transducer, or receiving the electrical signal from the photoelectric transducer.

In one embodiment of the present invention, wherein the optical signal processing unit is an optical signal transmitter, an optical signal receiver, or an optical signal transceiver.

In one embodiment of the present invention, wherein the optical signal processing device is a full-duplex optical signal processing device for transmitting optical signals in bidirectional, and comprises a pair of the optical signal processing units, a pair of the fiber cables, and a pair of the connection ports; wherein the connector module is a full-duplex connector for transmitting optical signals in bidirectional, and comprises a pair of the photoelectric transducers and a pair of the lenses.

DETAILED DESCRIPTION OF THE PREFERRED EMBODIMENTS

Figure 1:
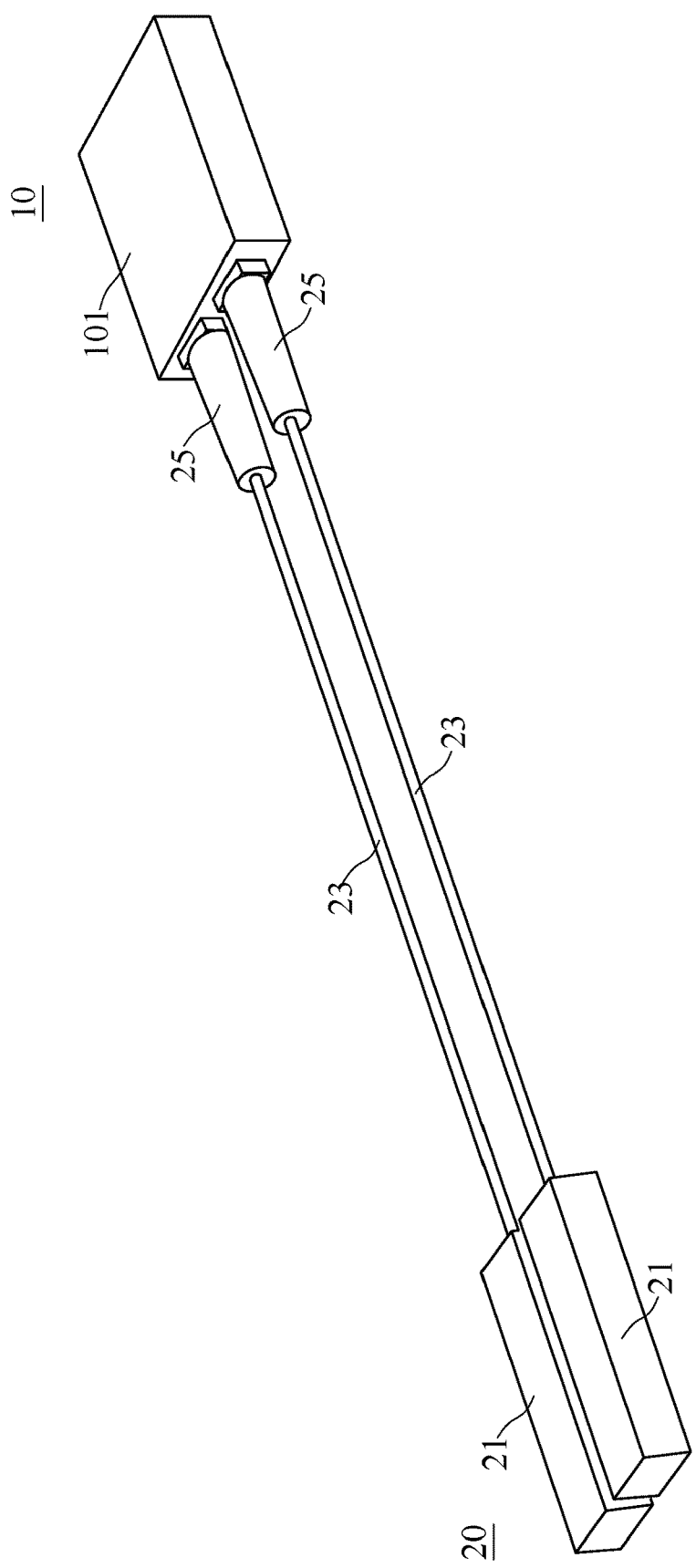
FIG. 1 is a three-dimensional structural diagram of a connector module having a shell and connected to an optical signal processing device according to one embodiment of the present application.
Figure 2:
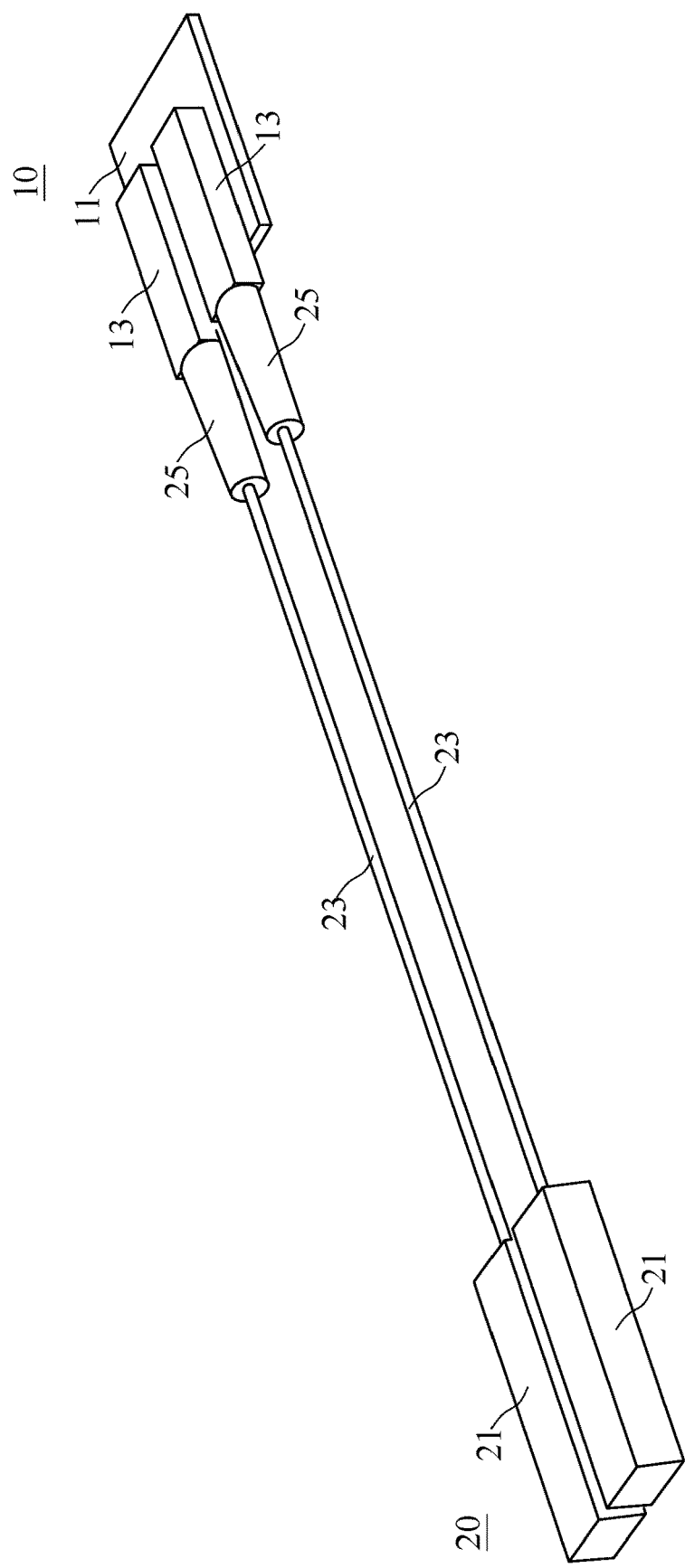
FIG. 2 is a three-dimensional structural diagram of a connector module without a shell and connected to an optical signal processing device according to one embodiment of the present application.
Figure 3:
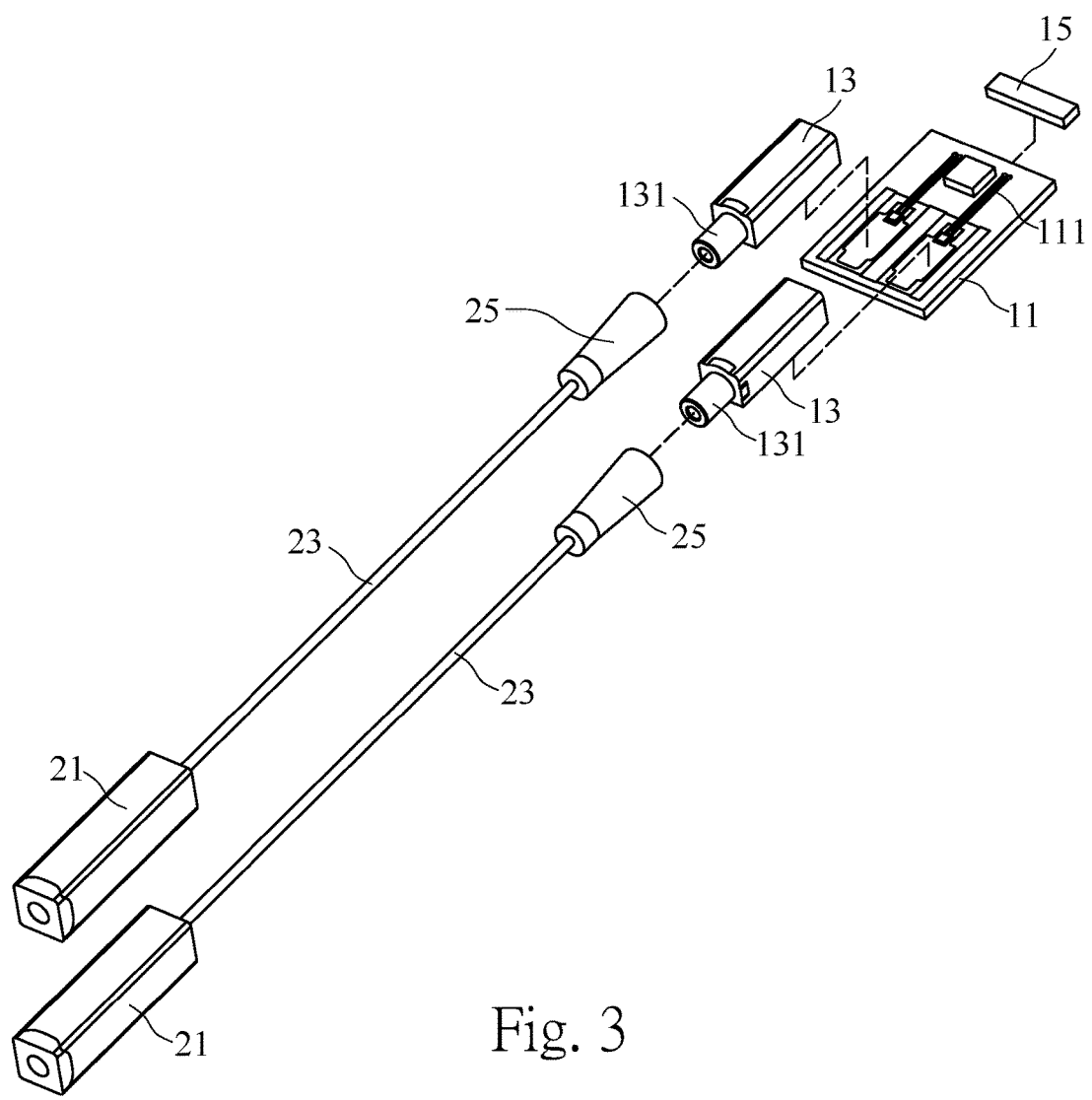
FIG. 3 is an exploded structural diagram of a connector module and an optical signal processing device according to one embodiment of the present application.
Figure 4:
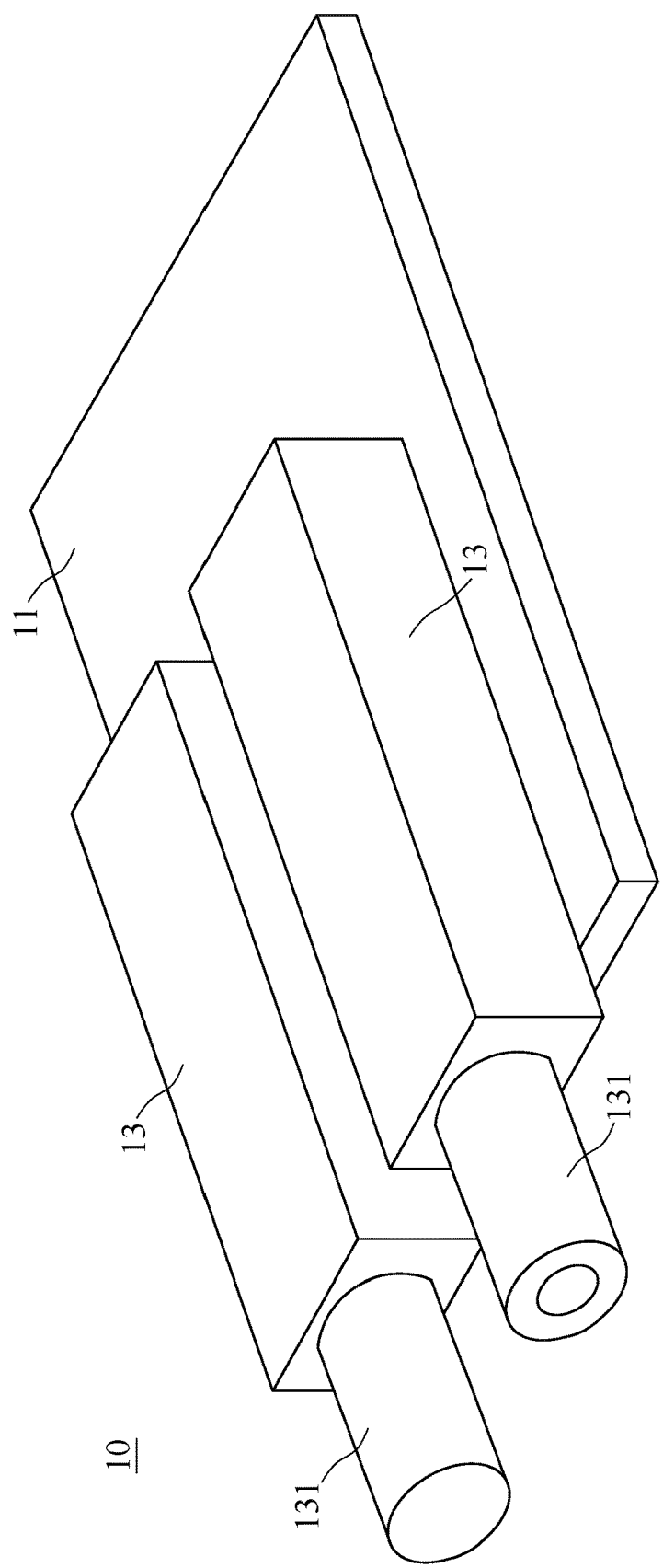
FIG. 4 is a first view angle of three-dimensional structural diagram of the connector module according to one embodiment of the present application.
Figure 5:
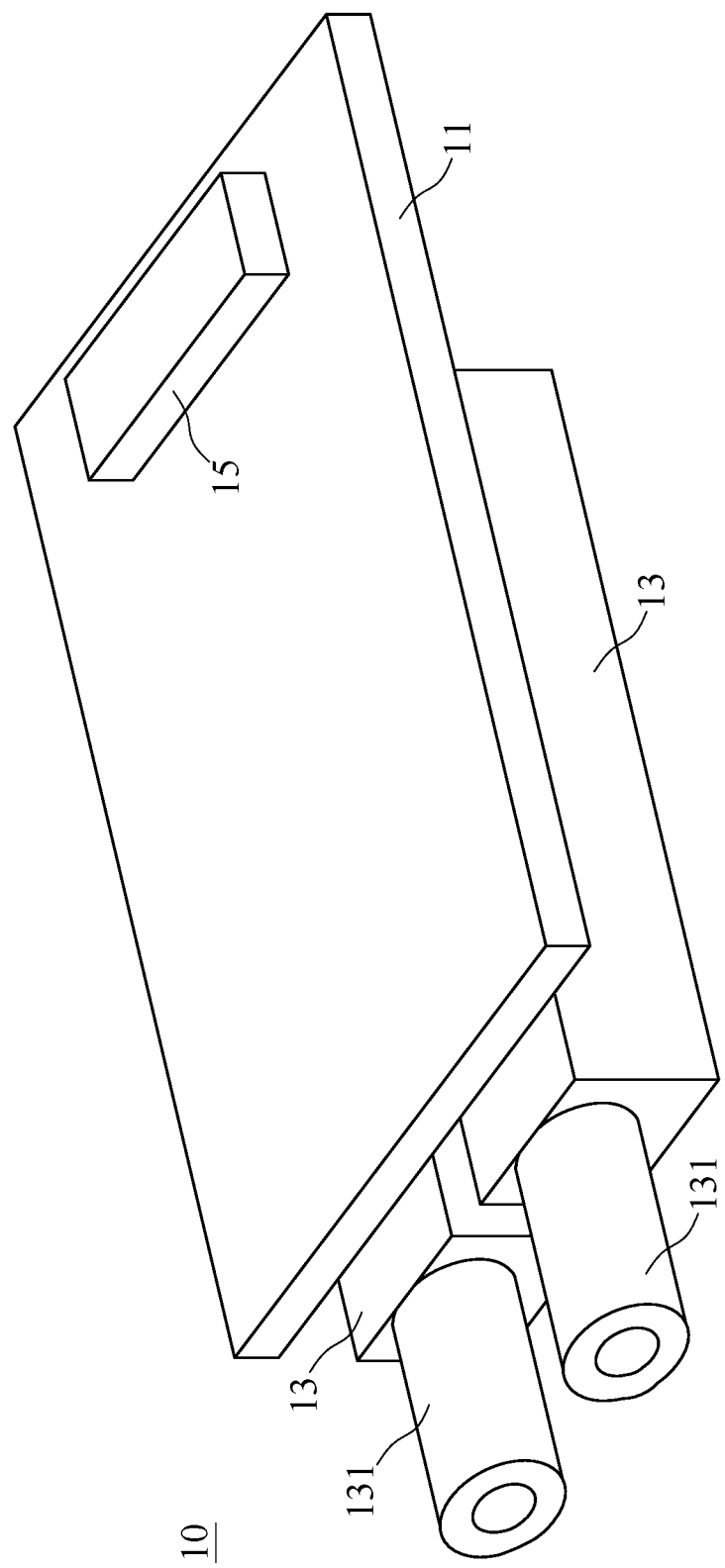
FIG. 5 is a second view angle of three-dimensional structural diagram of the connector module according to one embodiment of the present application.

Referring to FIGS. 1, 2, 3, 4, and 5, there are shown a three-dimensional structural diagram of a connector module having a shell and connected to an optical signal processing device according to one embodiment of the present application, a three-dimensional structural diagram of a connector module without a shell and connected to an optical signal processing device according to one embodiment of the present application, an exploded structural diagram of a connector module and an optical signal processing device according to one embodiment of the present application, a first view angle of three-dimensional structural diagram of the connector module according to one embodiment of the present application, and a second view angle of three-dimensional structural diagram of the connector module according to one embodiment of the present application. As shown in FIGS. 1 to 5, the connector module 10 of the present invention is a connected module for optical communication, and it is able to be connected to an optical signal processing device 20. The connector module 10 and the optical signal processing device 20 are allowed to transmit at least one optical signal therebetween.

The connector module 10 is having a shell 101 for covering electronic components disposed on the connector module 10. The electronic components of the connector module 10 comprises a circuit board 11, at least one photoelectric transducer 13, and a high frequency connector 15. The photoelectric transducer 13 is a component capable of transforming photoelectric signals, for example, the photoelectric transducer 13 can transform an optical signal into an electrical signal, or the electrical signal into the optical signal. The high frequency connector 15 is a gold finger connector, a pin header connector, an FPC (Flexible Printed Circuit) connector, a board to board connector, or other type connector capable of transmitting at least one high frequency electrical signal.

The photoelectric transducer 13 and the high frequency connector 15 are configured on the circuit board 11 in a way of COB (chip on board). In one embodiment of the present invention, the photoelectric transducer 13 and the high frequency connector 15 can be selectively configured on the same surface of the circuit board 11, for example, the photoelectric transducer 13 and the high frequency connector 15 can be all configured on the top surface of the circuit board 11. In another embodiment of the present invention, otherwise, the photoelectric transducer 13 and the high frequency connector 15 can be selectively configured on different surfaces of the circuit board 11, for example, the photoelectric transducer 13 can be configured on the top surface of the circuit board 11, and the high frequency connector 15 can be configured on the bottom surface of the circuit board 11. Besides, the circuit board 11 further comprises a plurality of circuit wires 111 that are laid on the top surface and/or the bottom surface of the circuit board 11. The photoelectric transducer 13 may be connected to the high frequency connector 15 via the circuit wires 111. Furthermore, the photoelectric transducer 13 is provided at an end thereof with a lens 131. In the present invention, the lens 131 is a miniaturized lens. The photoelectric transducer 13 can receive or send the optical signal via the lens 131.

In one embodiment of the present invention, the connector module 10 is further configured on a motherboard of an electronic device (not shown), the photoelectric transducer 13 of the connector module 10 is able to send the electrical signal to the motherboard or receive the electrical signal from the motherboard via the high frequency connector 15. In another embodiment of the present invention, otherwise, the circuit board 11 may be a motherboard of an electronic device, the photoelectric transducer 13 and the high frequency connector 15 are directly configured on the motherboard, the photoelectric transducer 13 is able to send the electrical signal to a controller or a processor (not shown) disposed on the motherboard or receive the electrical signal from the controller or the processor via the high frequency connector 15.

Thus, the connector module 10 is implemented by the COB process so that the volume of it will be effectively reduced to form a miniaturized connector module, which will be occupied a small space in the motherboard or the electronic device.

Sequentially, the optical signal processing device 20 of the present invention comprises at least one optical signal processing unit 21, at least one fiber cable 23, and at least one connection port 25. The fiber cable 23 comprises an end connected to the optical signal processing unit 21, and other end connected to the lens 131 of the photoelectric transducer 15 of the connector module 10 via the connection port 25. The connection port 25 is combined with the lens 131 in a way of embedding. In the present invention, the optical signal processing unit 21 is an optical signal transmitter, an optical signal receiver, or an optical signal transceiver. The optical signal is able to be transmitted between the connector module 10 and the optical signal processing device 20 via the fiber cable 23.

Accordingly, when the connector module 10 receives the optical signal from the optical signal processing device 20 via the fiber cable 23, the photoelectric transducer 13 can transform the optical signal into the electrical signal, and send the electrical signal to the motherboard via the high frequency connector 15. On the contrary, when the connector module 10 receives the electrical signal from the motherboard via the high frequency connector 15, the photoelectric transducer 13 can transform the electrical signal into the optical signal, and send the optical signal to the optical signal processing device 20 via the fiber cable 23.

In one preferred embodiment of the invention, the connector module 10 is a full-duplex connector module, which comprises a pair of photoelectric transducers 13 and a pair of lenses 131, while the optical signal processing device 20 is a full-duplex optical signal processing device, which comprises a pair of optical signal processing units 21, a pair of fiber cables 23, and a pair of connection ports 25. Thus, the connector module 10 and the optical signal processing device 20 can transmit the optical signals in bidirectional via two optical signal paths consisted of the photoelectric transducers 13, the lenses 131, the optical signal processing units 21, the fiber cables 23, and the connection ports 25, so as to increase the data transfer rate between the connector module 10 and the optical signal processing device 20.

As the above description, the advantages of the connector module 10 and the optical signal processing device 20 of the present application are as follows:

(1). the photoelectric transducer 13 and the high frequency connector 15 are implemented on the circuit board 11 in the way of COB, which can effectively reduce the volume and the manufacture cost of the connector module 10;

(2). the miniaturized lens 131 is adopted that can effectively reduce the space occupied by the connector module 10, increase the accuracy of optical positioning, and be assembled easily;

(3). the connector module 10 and the optical signal processing device 20 transmit signals in the way of optical communication, which can extend the transmission distance, reduce the signal decay and the radiation disturbance of EMI (Electromagnetic Interference), and improve the ability of signals energy concentration and the anti-interference;

(4). the connector module 10 and the optical signal processing device 20 can transmit the optical signals in bidirectional via two optical signal paths so as to increase the data transfer rate (such as 10 Gbps, 28 Gbps, or higher data transfer rate) between the connector module 10 and the optical signal processing device 20; and (5). the photoelectric transducer 13, and the high frequency connector 15 are selectively configured on different surface of the circuit board 11, respectively, so that the photoelectric transducer 13 and the high frequency connector 15 can obtain a large area of heat dissipation, and therefore the reliability of the photoelectric transducer 13 and the high frequency connector 15 in operation may be improved.

The above disclosure is only the preferred embodiment of the present invention, and not used for limiting the scope of the present invention. All equivalent variations and modifications on the basis of shapes, structures, features and spirits described in the claims of the present invention should be included in the claims of the present invention.

What is claimed is:

1. A connector module for optical communication, comprising:
   a circuit board comprising a plurality of circuit wires;
   a high frequency connector, configured on the circuit board in a way of chip on board; and
   at least one photoelectric transducer, configured on the circuit board in the way of chip on board, electrically connected to the high frequency connector and the circuit board via the circuit wires, and provided at a side thereof with a lens, wherein the photoelectric transducer receives an optical signal via the lens and transforms the optical signal into an electrical signal, and then sends the electrical signal to the high frequency connector; otherwise, the photoelectric transducer receives the electrical signal from the high frequency connector, transforms the electrical signal into the optical signal, and then sends the optical signal via the lens; wherein the high frequency connector is a connector capable of connecting an external electronic component, the electrical signal is able to be transmitted between the connector module and the external electronic component via the high frequency connector.

2. The connector module according to claim 1, wherein the connector module is a full-duplex connector for transmitting optical signals in bidirectional, which comprises a pair of the photoelectric transducers and a pair of the lenses.

3. The connector module according to claim 1, wherein the high frequency connector is a gold finger connector, a pin header connector, an FPC connector, a board to board connector, or other type connector capable of transmitting at least one high frequency electrical signal.

4. The connector module according to claim 1, wherein the photoelectric transducer and the high frequency connector are configured together on the same surface of the circuit board, or the photoelectric transducer and the high frequency connector are configured on different surfaces of the circuit board.

5. The connector module according to claim 1, wherein the connector module is configured on a motherboard of an electronic device, the photoelectric transducer of the connector module is able to send the electrical signal to the motherboard or receive the electrical signal from the motherboard via the high frequency connector.

6. The connector module according to claim 1, wherein the circuit board is a motherboard of an electronic device, the photoelectric transducer and the high frequency connector are directly configured on the motherboard.

7. An optical signal processing device, which is connected to a connector module, wherein the connector module comprises a circuit board, a high frequency connector, and at least one photoelectric transducer, the high frequency connector and the photoelectric transducer are configured on the circuit board in a way of chip on board, the circuit board comprises a plurality of circuit wires, the photoelectric transducer is electrically connected to the high frequency connector and the circuit board via the circuit wires, and provided at a side thereof with a lens, wherein the high frequency connector is a connector capable of connecting an external electronic component, the electrical signal is able to be transmitted between the connector module and the external electronic component via the high frequency connector, the optical signal processing device comprising:
   at least one optical signal processing unit; and
   at least one fiber cable comprising an end connected to the optical signal processing unit, and other end connected to the lens of the photoelectric transducer of the connector module by a connection port;
   wherein at least one optical signal is transmitted between the optical signal processing device and the connector module via the fiber cable, the photoelectric transducer is used for transforming the optical signal into an electrical signal or the electrical signal into the optical signal, the high frequency connector is used for sending the electrical signal to the photoelectric transducer, or receiving the electrical signal from the photoelectric transducer.

8. The optical signal processing device according to claim 7, wherein the optical signal processing unit is an optical signal transmitter, an optical signal receiver, or an optical signal transceiver.

9. The optical signal processing device according to claim 7, wherein the optical signal processing device is a full-duplex optical signal processing device for transmitting optical signals in bidirectional, and comprises a pair of the optical signal processing units, a pair of the fiber cables, and a pair of the connection ports; wherein the connector module is a full-duplex connector for transmitting optical signals in bidirectional, and comprises a pair of the photoelectric transducers and a pair of the lenses.

10. The optical signal processing device according to claim 7, wherein the connector module is configured on a motherboard of an electronic device, the photoelectric transducer of the connector module is able to send the electrical signal to the motherboard or receive the electrical signal from the motherboard via the high frequency connector.

11. The optical signal processing device according to claim 7, wherein the circuit board is a motherboard of an electronic device, the photoelectric transducer and the high frequency connector are directly configured on the motherboard.

* * * * *